(12) United States Patent
Squire et al.

(10) Patent No.: US 6,444,743 B1
(45) Date of Patent: Sep. 3, 2002

(54) RUBBER COMPOSITIONS CONTAINING GROUND CURING BLADDER RUBBER

(75) Inventors: Nicole L. Squire; Michael S. James, both of Cuyahoga Falls; William J. O'Briskie, Uniontown, all of OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/384,649

(22) Filed: Aug. 27, 1999

(51) Int. Cl.$^7$ ................................. C08L 53/00
(52) U.S. Cl. .................... 524/500; 524/505; 521/40; 521/41
(58) Field of Search ................ 524/500, 505; 521/40, 41

(56) References Cited

U.S. PATENT DOCUMENTS

| | | | |
|---|---|---|---|
| 4,374,573 A | 2/1983 | Rouse et al. | 241/101.7 |
| 4,485,135 A | * 11/1984 | Koch | 428/36 |
| 4,714,201 A | 12/1987 | Rouse et al. | 241/24 |
| 5,238,194 A | 8/1993 | Rouse et al. | 241/21 |
| 5,411,215 A | 5/1995 | Rouse | 241/21 |

* cited by examiner

Primary Examiner—Peter D. Mulcahy
(74) Attorney, Agent, or Firm—Meredith Palmer; Daniel Hudak

(57) ABSTRACT

Rubber compositions such as tire innerliners contain significant amounts of ground, fine size tire curing bladder rubber as a filler. Critical properties such as air retention are not affected and spent or old curing bladder rubber which would otherwise go to a landfill is effectively recycled.

8 Claims, No Drawings

RUBBER COMPOSITIONS CONTAINING GROUND CURING BLADDER RUBBER

FIELD OF INVENTION

The present invention relates to the recycling of spent tire curing bladders, which essentially contain cured butyl rubber, by grinding the bladders into fine size particles for use as a filler in rubber compositions.

BACKGROUND OF THE INVENTION

Heretofore, spent or old tire bladders used in shaping the internal portion of a tire in a curing mold have generally been scrapped and discarded as a solid waste material in a landfill. Some of the tire curing bladders have been recycled by cutting the same in the form of a shoe sole, a beach tong, and the like.

SUMMARY OF INVENTION

A rubber blend composition suitable for use in a tire as for the innerliner thereof is made by mixing rubber compounds such as halobutyl rubber containing additives therein with fine size particles derived from grinding old, spent tire curing bladders. The blend when used as an innerliner for a tire has good physical properties such as air retention.

DETAILED DESCRIPTION

Curing bladders are utilized for making tires for off-the-road vehicles such as tractors, earth-moving equipment, and the like, as well as for on the road vehicles such as passenger cars, trucks, buses, and the like. Curing bladders are typically made from butyl rubber and contain conventional amounts of various rubber additives such as carbon black, oil, zinc oxide, generally phenolic curing aids and optionally small amounts of sulfur and sulfur accelerators. The amount of the various additives will vary from manufacturer to manufacturer, but generally include from about 20 to about 100 and desirably from about 40 to about 65 parts by weight of carbon black for every 100 parts by weight of butyl rubber (PHR), from about 2 to about 20 and desirably from about 5 to about 15 parts by weight of oil PHR, from about 3 to about 15 parts by weight of phenolic curing resins PHR, and very small amounts of zinc oxide such as from about 1.0 to about 8 parts by weight PHR.

It is an important aspect of the present invention that the generally spent, old, or used cured curing bladders are ground into fine size particles. The particle size according to U.S. Standard Mesh is generally from about 30 mesh to about 200 mesh and desirably smaller than 60 mesh such as from about 60 mesh to about 100 mesh. Generally any rubber grinding method or process can be utilized so long as the rubber is not scorched or degraded during grinding thereof. One particular method of grinding involves grinding the rubber in the presence of water, which keeps the rubber temperature low to prevent reversion. A more detailed description of such a preferred grinding method is set forth in U.S. Pat. Nos. 4,374,573; 4,714,201; 5,238,194; and 5,411,215, which are hereby fully incorporated by reference. Cryogenically ground rubber can also be utilized.

While the innerliner rubber can contain butyl rubber, preferably it contains halobutyl rubbers such as chlorobutyl or bromobutyl rubber. More preferably, the innerliner rubber is predominately bromobutyl rubber with optionally small amounts of natural rubber therein as from about 0 or 0.1 to about 50 percent by weight and desirably about 5 to about 15% by weight based upon the total weight of the butyl rubber and the natural rubber (PHR). The innerliner rubber can contain various conventional or typical innerliner additives such as carbon black; oil; curing aids such as sulfur, sulfur-containing compounds, and the like; vulcanizing accelerators such as amines, disulfides, guanidines, thioureas, thiazoles, thiurams, sulfenamides, dithiocarbamates, and the like; various anti-oxidants such as phenylene di-amines; various antiozonates; various aliphatic acids such as stearic acid; zinc oxide; various waxes such as micro-crystalline wax; various peptizers; various retarders, various resins, various fillers such as clays; silica; silica coupling agents; and the like. While the amount of the various additives will vary from one tire manufacturer to another, they generally include from about 20 to about 100 and desirably from about 50 to about 90 parts by weight of carbon black PHR, from about 5 to about 20 parts by weight of oil PHR, from about 0.5 to about 4.0 parts by weight of stearic acid PHR, from about 0.5 to about 8 parts by weight of zinc oxide PHR, from about 0.1 to about 3.0 parts by weight of sulfur PHR, from about 0.5 to about 5.0 parts by weight of sulfur accelerators, and the like.

According to the present invention, from about 1 to about 60 parts by weight and desirably from about 2 to about 20 parts by weight of ground cured curing bladder rubber particles are added to 100 parts by weight of an uncured innerliner rubber and blended in any conventional or typical manner. Suitable mixing methods include blending in a Banbury, mixing on a two-roll mill, or the like. More specifically, the fine ground cured curing bladder or rubber particles containing additives therein are added to butyl and/or halobutyl polymers, carbon black, stearic acid, oils and resins in a Banbury mixer and mixed to form an innerliner master batch. Zinc oxide, sulfur, and accelerators are then added to the master batch and blended as in a Banbury mixer to form the blended rubber composition of the present invention. The blended innerliner rubber compound-cured curing bladder particles are processed in a calender to form sheets of any desired width and thickness. In the assembly of a tire, the sheeted rubber innerliner-curing bladder rubber particle blend is applied to a tire assembly machine and the various other tire components applied thereto. The tire is then formed into its final shape and cured in a curing press.

The present invention is environmentally friendly inasmuch as spent or old curing bladders do not end up in landfills but rather are recycled into useful products such as a tire innerliner. When utilized as a tire innerliner, good retention, or substantially no loss of properties such as high air impermeability, is obtained. The utilization of the ground curing bladder rubber particles can also result in a cost saving in the preparation of a tire innerliner.

The present invention will be better understood by reference to the following examples, which serve to illustrate but not to limit the invention.

EXAMPLE 1

The following innerliner formulations were prepared:

| | COMPOUND A | | |
|---|---|---|---|
| | Control | Example 1 | Example 2 |
| Halobutyl | 90.00 | 90.00 | 90.00 |
| Natural Rubber | 10.00 | 10.00 | 10.00 |

-continued

COMPOUND A

|  | Control | Example 1 | Example 2 |
|---|---|---|---|
| Carbon Black | 65.00 | 65.00 | 65.00 |
| Retarder | 0.15 | 0.15 | 0.15 |
| Oil | 11.00 | 11.00 | 11.00 |
| Resin | 11.50 | 11.50 | 11.50 |
| 60 Mesh Ground curing Bladder | — | 4.00 | 15.00 |
| Stearic Acid | 2.00 | 2.00 | 2.00 |
| Zinc Oxide | 3.00 | 3.00 | 3.00 |
| Accelerator | 1.30 | 1.30 | 1.30 |
| Sulfur | .50 | .50 | .50 |

COMPOUND B

|  | Control | Example 1 | Example 2 |
|---|---|---|---|
| Halobutyl | 65.00 | 65.00 | 65.00 |
| Natural Rubber | 35.00 | 35.00 | 35.00 |
| Carbon Black | 65.00 | 65.00 | 65.00 |
| Oil | 7.00 | 7.00 | 7.00 |
| Resin | 4.00 | 4.00 | 4.00 |
| Processing Aid | 0.30 | 0.30 | 0.30 |
| 60 Mesh Ground curing Bladder | — | 4.00 | 15.00 |
| Stearic Acid | 2.00 | 2.00 | 2.00 |
| Zinc Oxide | 3.00 | 3.00 | 3.00 |
| Accelerator | 1.30 | 1.30 | 1.30 |
| Sulfur | .50 | .50 | .50 |

A masterbatch was prepared by adding the halobutyl rubber, the natural rubber, carbon black, retarder, oil, resin, processing aid, stearic acid, and ground curing bladder to a Banbury and mixing for 45 seconds to two minutes and discharging at a temperature of from about 240° F. to about 280° F. Then, zinc oxide, accelerator, and sulfur were added to the masterbatch and mixed in the Banbury for 45 seconds to 2 minutes and discharged at a temperature of about 160° F. to about 250° F.

The above formulation was tested with regard to air retention and the results thereof are set forth in Table 1.

TABLE I

Tire Air Retention Test on Ground Curing Bladders in Innerliner (180 Day Test)

| TEST | (CONTROL) | EX. 1 | EX. 2 |
|---|---|---|---|
| % Avg. Air Loss/month | A<br>1.56 | A w/4 phr<br>1.51 | A w/15 phr<br>1.56 |
| % Avg. Air Loss/month | B<br>2.35 | B w/4 phr<br>2.35 | B w/15 phr<br>2.06 |

The air retention test was conducted by inflating a tire to a specific pressure depending upon the type and load range of the tire. The tire was tested in an environmentally controlled room. It was allowed to grow for a minimum of 48 hours. The pressure was then reset to the test inflation (depending upon the type and load range of the tire). The date, time, ambient temperature, barometric pressure and tire pressure were recorded for 180 days.

As apparent from the table, air retention of the tire was generally maintained or even improved with the addition of the recycled ground fine sized curing bladder rubber.

While in accordance with the patent statutes, the best mode and preferred embodiment have been set forth, the scope of the invention is not limited thereto, but rather by the scope of the attached claims.

What is claimed is:

1. A butyl rubber composition, comprising:

a blend or a rubber comprising butyl rubber, halobutyl rubber, or combinations thereof, and ground curing bladder rubber particles, and wherein said rubber composition contains from about 5 to about 50 percent by weight of natural rubber based upon a total weight of said natural rubber and said butyl rubber, said halobutyl rubber, or combinations thereof.

2. A butyl rubber composition, comprising:

a blend or a rubber comprising butyl rubber, halobutyl rubber, or combinations thereof, and ground curing bladder rubber particles, and; a sulfur curing agent.

3. A butyl rubber composition according to claim 2, wherein the size of said ground curing bladder rubber particles is from about 30 to about 200 U.S. Standard Mesh.

4. A butyl rubber composition according to claim 3, wherein the amount of said ground curing bladder particles is from about 1 to about 60 parts by weight per 100 parts by weight of said rubber.

5. A butyl rubber composition according to claim 3, wherein the size of said ground curing bladder rubber particles is from about 60 to about 100 U.S. Standard Mesh, and wherein the amount of said particles is from about 2 to about 20 parts by weight per 100 parts by weight of said rubber.

6. A butyl rubber composition according to claim 1, wherein said rubber composition is cured, and wherein the curing agent is sulfur.

7. A butyl rubber composition according to claim 5, wherein said rubber compositions contains about 20 to about 100 parts by weight per hundred parts rubber of a rubber filler comprising carbon black, silica and clay or combinations thereof.

8. A butyl rubber composition according to claim 7, wherein said rubber compositions contains:

from about 5 to about 20 parts by weight per hundred parts rubber of oil;

from about 0.5 to about 4.0 parts by weight per hundred parts rubber of stearic acid;

from about 0.1 to about 3.0 parts by weight per hundred parts rubber of sulfur; and from about 0.5 to about 5.0 parts by weight per hundred parts rubber of accelerators.

* * * * *